(12) United States Patent
McCloskey

(10) Patent No.: US 11,344,139 B2
(45) Date of Patent: May 31, 2022

(54) DESSERT DISPLAY STAND

(71) Applicant: Monique McCloskey, Oceanside, CA (US)

(72) Inventor: Monique McCloskey, Oceanside, CA (US)

( * ) Notice: Subject to any disclaimer, the term of this patent is extended or adjusted under 35 U.S.C. 154(b) by 0 days.

(21) Appl. No.: 16/950,353

(22) Filed: Nov. 17, 2020

(65) Prior Publication Data
US 2021/0145191 A1 May 20, 2021

Related U.S. Application Data

(60) Provisional application No. 62/936,974, filed on Nov. 18, 2019.

(51) Int. Cl.
A47F 7/00 (2006.01)
A47F 5/10 (2006.01)
A23G 3/56 (2006.01)
F16B 5/00 (2006.01)

(52) U.S. Cl.
CPC ............ A47F 7/0028 (2013.01); A23G 3/563 (2013.01); A47F 5/10 (2013.01); A47F 7/0071 (2013.01); F16B 5/0036 (2013.01); A23V 2002/00 (2013.01)

(58) Field of Classification Search
CPC ........ A47F 7/0071; A47F 7/0028; A47F 5/10; A23G 3/563; A47B 43/04; A47B 47/042; F16B 5/0036; F16B 5/0012
USPC ...................................................... 211/85.4
See application file for complete search history.

(56) References Cited

U.S. PATENT DOCUMENTS

| 1,061,297 | A | * | 5/1913 | Johnson | B65D 5/32 229/122.21 |
| 1,611,589 | A | * | 12/1926 | Janusek | A01G 5/04 428/27 |
| 1,647,154 | A | * | 11/1927 | Soybel | A47F 5/112 211/70.1 |
| 1,966,734 | A | | 7/1934 | Samuel | |
| 3,066,436 | A | * | 12/1962 | Schuh | A63H 33/06 446/115 |
| 5,755,325 | A | | 5/1998 | Willhite et al. | |
| 5,864,998 | A | * | 2/1999 | Loomer | B66C 6/00 52/844 |
| 6,056,120 | A | * | 5/2000 | Hollingsworth | A47F 5/11 206/562 |
| 6,283,312 | B1 | * | 9/2001 | Edgerton | A47F 5/0006 211/113 |
| 6,561,363 | B1 | | 5/2003 | Willhite et al. | |
| 6,711,860 | B2 | * | 3/2004 | Fleishman | E04B 1/34321 52/81.3 |
| 7,966,786 | B2 | * | 6/2011 | Koteskey | E02D 29/121 220/4.04 |
| 8,590,976 | B2 | * | 11/2013 | Davis | A47C 4/021 297/440.13 |

(Continued)

Primary Examiner — Stanton L Krycinski
(74) Attorney, Agent, or Firm — Boudwin Intellectual Property; Daniel Boudwin

(57) ABSTRACT

A dessert display stand. The dessert display stand includes a number of panels. Each panel is defined by a first side and a second side. The first side of each panel includes a male interface. The second side of each panel includes a female interface. The male interface is designed to engage the female interface of an adjoining panel. At least one channel is placed in each panel. Each channel is designed to receive a dessert stick therethrough.

10 Claims, 4 Drawing Sheets

(56) References Cited

U.S. PATENT DOCUMENTS

| | | | |
|---|---|---|---|
| 8,800,234 B2 * | 8/2014 | Taillefer | F16B 5/0036 |
| | | | 52/587.1 |
| 9,556,605 B2 * | 1/2017 | Elliott | A47C 4/021 |
| 9,743,788 B1 | 8/2017 | Wilson | |
| 9,833,085 B2 * | 12/2017 | Adair | A47F 3/12 |
| 10,231,557 B2 * | 3/2019 | Wilke | A47F 5/112 |
| 10,477,990 B2 * | 11/2019 | Seba Raffoul | A47F 5/112 |
| 2003/0226782 A1 | 12/2003 | Loughlin et al. | |
| 2014/0109515 A1 | 4/2014 | Cigana et al. | |

\* cited by examiner

DESSERT DISPLAY STAND

CROSS REFERENCE TO RELATED APPLICATIONS

This application claims the benefit of U.S. Provisional Application No. 62/936,974 filed on Nov. 18, 2019. The above identified patent application is herein incorporated by reference in its entirety to provide continuity of disclosure.

BACKGROUND OF THE INVENTION

The present invention relates to a lollipop display stand. More specifically, the present invention provides a modular, customizable apparatus for securing and displaying lollipops in a desired manner.

Many people enjoy sweet desserts. One trend in desserts is the rise of "cake pops." Cake pops are small portions of cake that may be mixed with icing as a binder and placed on a lollipop stick and covered with melted chocolate, or a similar substance. This allows for the consumer to eat the cake pop quickly and easily. Storing a food item, such as a cake pop, on a stick can be difficult and frustrating. This is due not only to the delicate nature of the edible component of the cake pop, but also due to the inherent structural instability of the cake pop itself. Specifically, the weight distribution of a cake pop favors the top end of the cake pop. This means that cake pops that are improperly stored and fall may cause damage to the edible portion of the cake pop. Damaged cake pops may result in a loss of sales as consumers are less likely to eat a damaged cake pop than an undamaged cake pop. Additionally, when preparing large numbers of cake pops, it can be difficult to support several cake pops after dipping in chocolate or candy melts to harden.

Many cake pop stands are bulky and take up a considerable amount of space on a countertop or in a storefront. Some stands may be displayed in a manner where they are unattractive or unaesthetic. This may be a significant inconvenience if an individual is displaying the cake pops for an event such as a party or a wedding. Ideally, a cake pop stand should be capable of being decorated and customized in order to match a desired design scheme or aesthetic.

SUMMARY OF THE INVENTION

In view of the foregoing disadvantages inherent in the known types of lollipop, cake pop and popsicle display stands now present in the prior art, the present invention provides a dessert display stand wherein the same can be utilized for providing convenience for the user when displaying specific types of desserts.

The present system comprises a plurality of panels. Each panel of the plurality of panels comprises a first side opposite a second side. The first side comprises a male interface, the second side comprises a female interface. The male interface is configured to engage the female interface of an adjoining panel of the plurality of panels. At least one channel is disposed on each panel between the first side and the second side of each panel of the plurality of panels. Each channel is dimensioned to receive a stick from a dessert therethrough.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
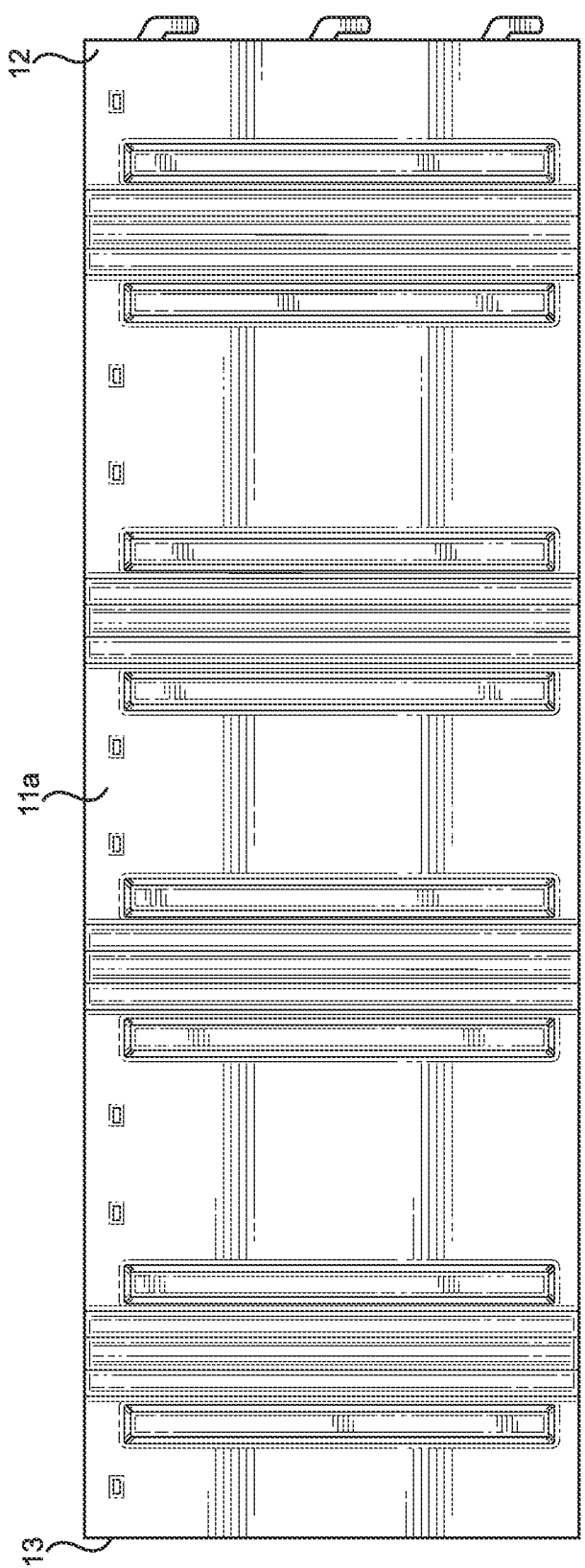
FIG. 1 shows a perspective view of a panel of an embodiment of the dessert display stand.

Reference is made herein to the attached drawings. Like reference numerals are used throughout the drawings to depict like or similar elements of the dessert display stand. The figures are intended for representative purposes only and should not be considered to be limiting in any respect.

Figure 2:
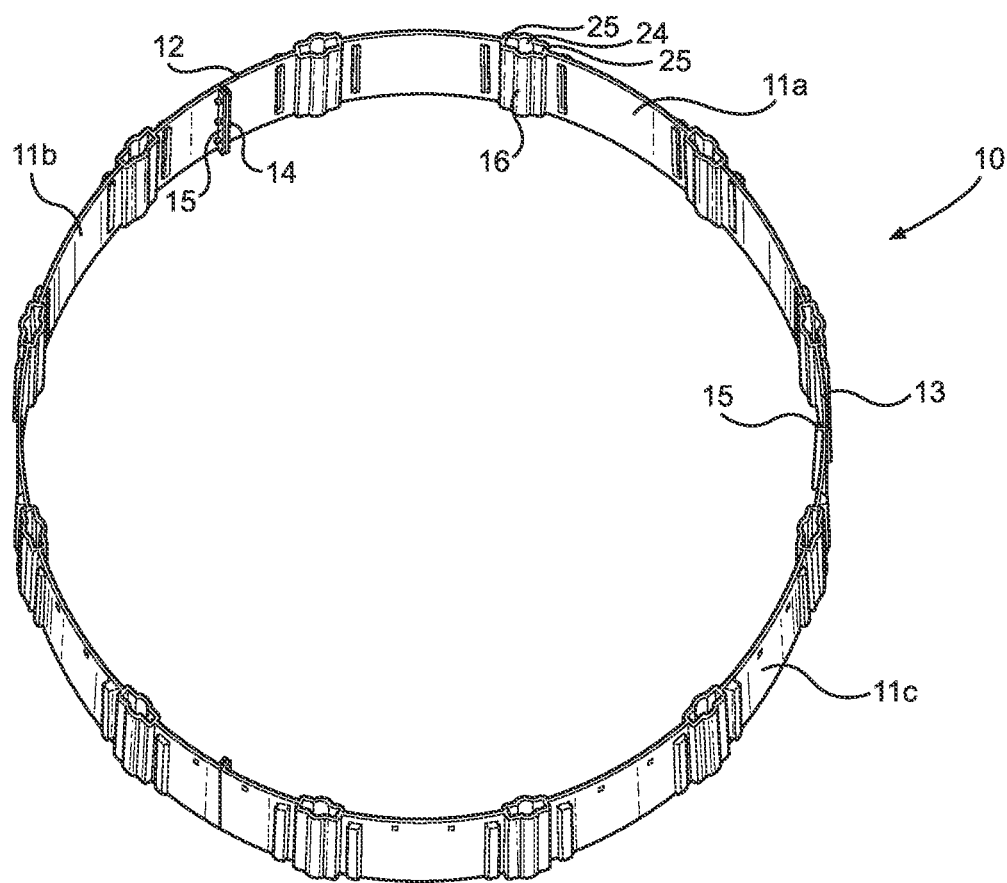
FIG. 2 shows a perspective view of an embodiment of the dessert display stand in an assembled state.

Referring now to FIGS. 1 and 2, there is shown a perspective view of a panel of an embodiment of the dessert display stand and a perspective view of an embodiment of the dessert display stand in an assembled state, respectively. The dessert display stand 10 comprises a plurality of panels 11a, 11b, 11c. Each panel of the plurality of panels 11a, 11b, 11c is defined by a first side 12 disposed opposite a second side 13. Each panel of the plurality of panels 11a, 11b, 11c is of any suitable size and configuration for defining a desired shape when assembled (as shown). In the illustrated embodiment, each panel of the plurality of panels 11a, 11b, 11c is arcuate in shape. As such, when the plurality of panels 11a, 11b, 11c are placed together, they form a circular arrangement. In other embodiments, the plurality of panels 11a, 11b, 11c are planar, allowing the plurality of panels 11a, 11b, 11c to be readily stacked for storage.

Each first side 12 of each panel of the plurality of panels 11a, 11b, 11c comprises a male interface 14. Each second side 13 of each panel of the plurality of panels 11a, 11b, 11c comprises a female interface 15. Each male interface 14 is configured to engage the female interface 15 of an adjoining panel of the plurality of panels 11a, 11b, 11c. For example, if the plurality of panels 11a, 11b, 11c consists of a first panel 11a, a second panel 11b, and a third panel 11c, the male interface 14 of the first panel 11a would engage the female interface 15 of the second panel 11b. The male interfaces 14 and the female interfaces 15 allow for the dessert display stand 10 to be placed into an assembled configuration. The assembled configuration is defined where each male interface 14 is engaged with a female interface 15. The male interface 14 and the female interface 15 are of any suitable configuration for holding the plurality of panels 11a, 11b, 11c in a stable, defined position. In the illustrated embodiment, the male interface 14 and the female interface 15 extend inwardly from the first side 12 and the second side 13 of each panel of the plurality of panels 11a, 11b, 11c. As such, the connections of the male interface 14 to the female interface 15 will not be visible from outside of the dessert display stand 10.

Each panel of the plurality of panels 11a, 11b, 11c comprises at least one channel 16 defined therein. Each channel 16 is disposed between the first side 12 and the second side 13 of each panel of the plurality of panels 11a, 11b, 11c. Structurally, each channel 16 is dimensioned to receive a stick of a dessert, such as a lollipop, a cake pop, or a popsicle, therethrough. The plurality of channels 16 comprise an opening 24, 25. The opening 24, 25 is of any suitable configuration for receiving a stick of a desired dessert. For example, the opening 24, 25 may comprise a circular opening, such that the channel 16 is configured to receive a stick such as a lollipop stick or a cake pop stick. Alternatively, the opening 24, 25 may comprise an elongated opening, such that the channel 16 is configured to receive a stick such as a popsicle stick or the like. In the illustrated embodiment, the opening comprises a circular opening 24 with a pair of peripheral slots 25 extending outward therefrom. In such an embodiment, both circular sticks, such as lollipop sticks, cake pop sticks and the like may be inserted, as well as stick with elongated lengths, such as popsicle sticks and the like.

Figure 3:
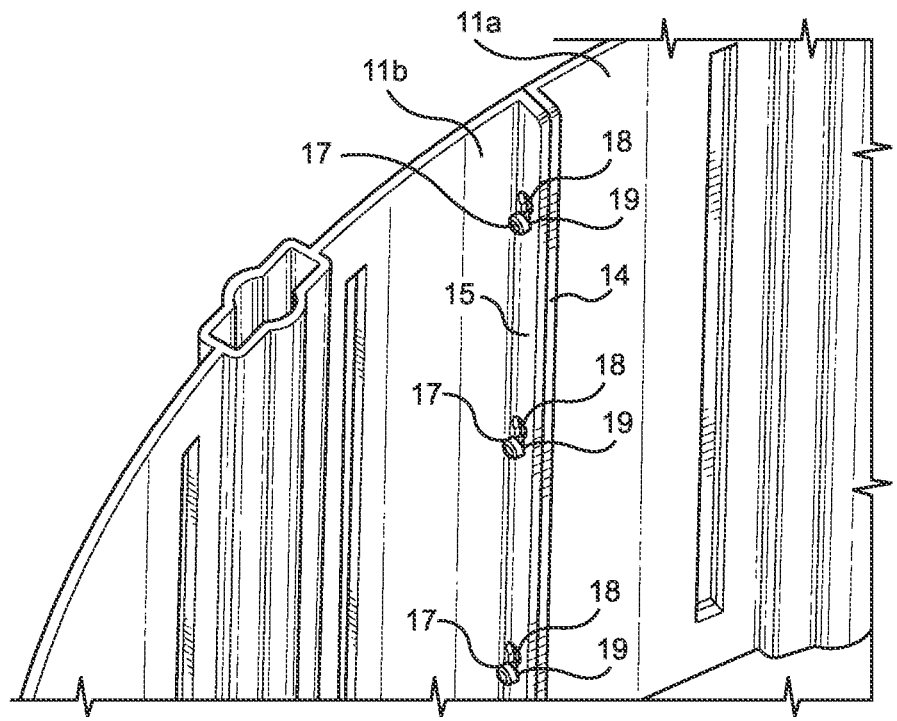
FIG. 3 shows a close-up view of a first embodiment of the dessert display stand.

Referring now to FIG. 3, there is shown a close-up view of a first embodiment of the dessert display stand. In the illustrated embodiment, the male interface 14 comprises a plurality of spherical protrusions 17. Furthermore, in the demonstrated embodiment, the female interface 15 comprises a plurality of circular apertures 18. A singular slot 19 extends downward from each circular aperture of the plurality of circular apertures 18. As such, when the male interface 14 is engaged with the female interface 15, the plurality of spherical protrusions 17 will extend through the plurality of circular apertures 18. As the male interface 14 of the first panel 11a is lowered relative to the female interface 15 of the second panel 11b, the plurality of singular slots 19 will prevent the plurality of spherical protrusions 17 from separating, maintaining the first panel 11a and the second panel 11b in a stable position.

Figure 4:
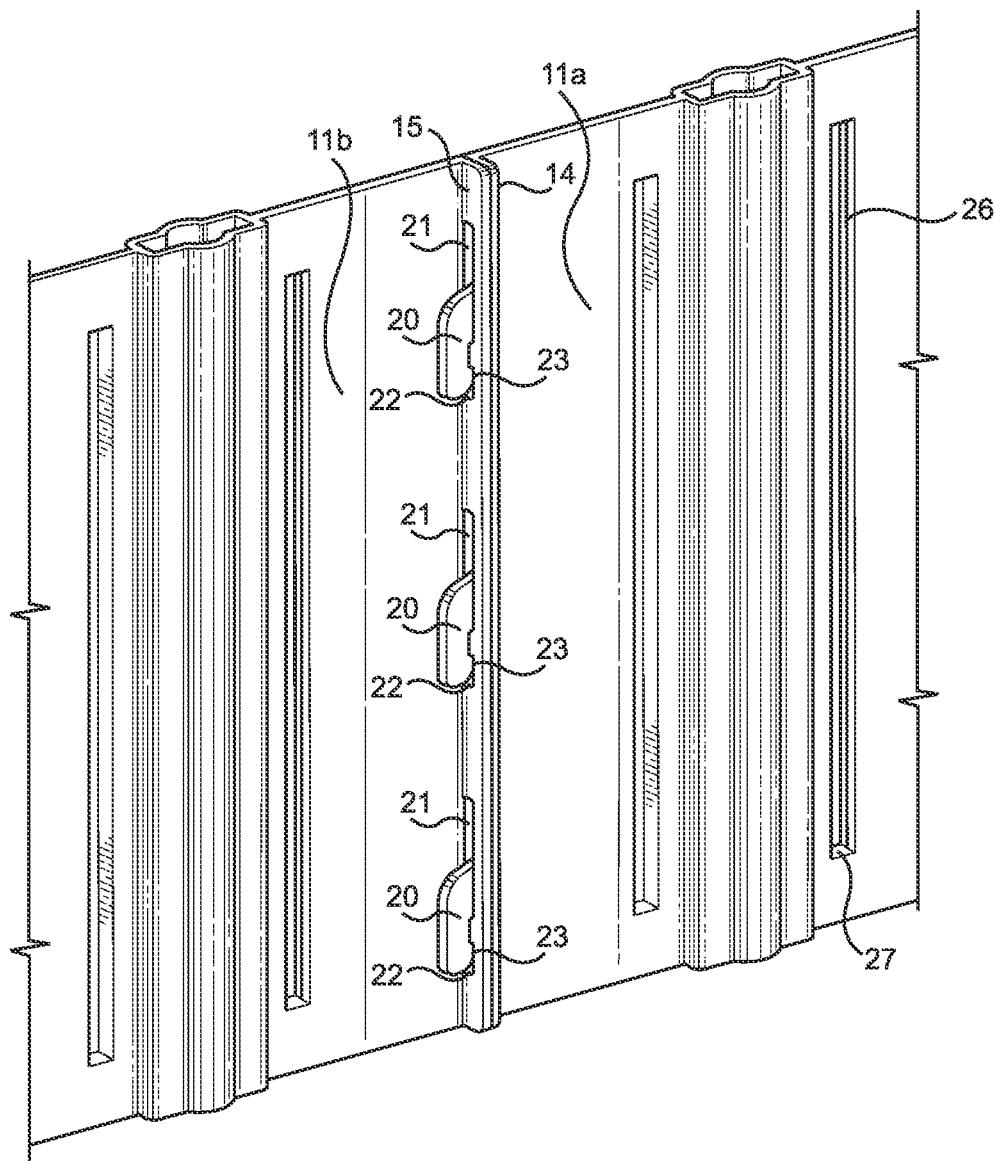
FIG. 4 shows a close-up view of a second embodiment of the dessert display stand.

Referring now to FIG. 4, there is shown a close-up view of a second embodiment of the dessert display stand. In the illustrated embodiment, the male interface 14 comprises a plurality of downward protrusions 20. Furthermore, in the illustrated embodiment, the female interface 15 comprises a plurality of slots 21. As such, when the male interface 14 is engaged with the female interface 15, the plurality of downward protrusions 20 will be secured within the plurality of slots 21, preventing separation of the first panel 11a from the second panel 11b. In the specific embodiment, the female interface 14 further comprises a notch 22. As such, in embodiments where the downward protrusion comprises a distal inward extension 23, the first panel 11a may be further secured to the second panel 11b, enhancing the stability of the dessert display stand.

Furthermore, in some embodiments, the plurality of panels 11a, 11b comprises at least one decoration receptacle disposed on an external surface of each panel 11a, 11b. Each decoration receptacle comprises a pair of grooves 26 extending outward from the plurality of panels 26. The pair of grooves 26 are of any suitable size and configuration for receiving a decorative element, such as a card or a slip, therein. As shown, each groove 26 comprises a closed base 27 to provide support to the decorative element inserted therein. Each groove 26 further comprises an open top through which the card or the slip may be inserted (as shown in FIG. 5).

Figure 5:
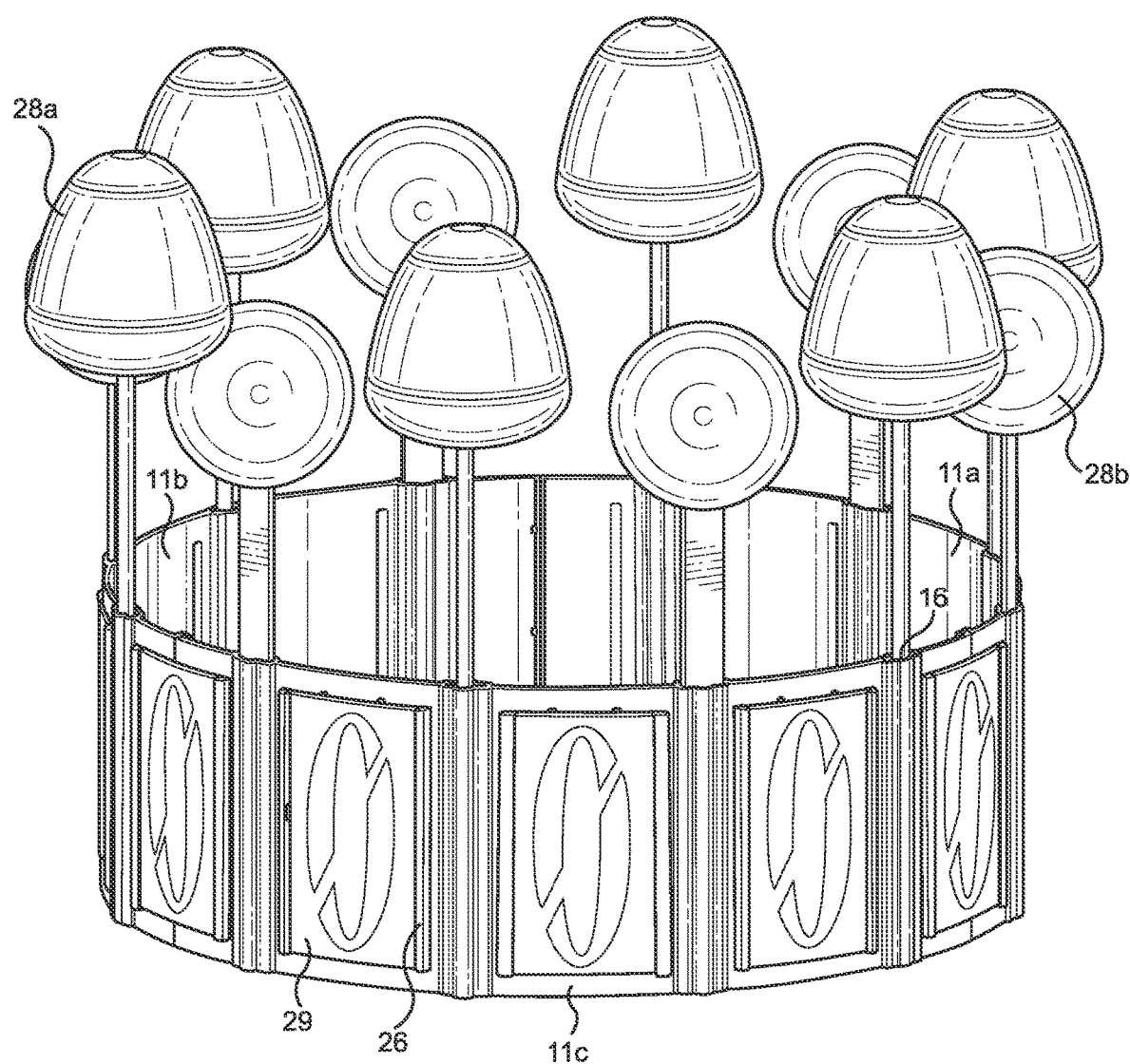
FIG. 5 shows a perspective view of an embodiment of the dessert display stand in use.

Referring now to FIG. 5, there is shown a perspective view of an embodiment of the dessert display stand in use. In use, the plurality of panels 11a, 11b, 11c are placed into a desired shape. In order to maintain the desired shape, the male interface and the female interface are adjoined together via engagement of each male interface with each corresponding female interface. As such, the desired shape will be maintained in a stable position.

Upon the establishment of the desired shape, desserts 28a, 28b may be inserted in the plurality of channels 16 of each panel of the plurality of panels 11a, 11b, 11c. In the illustrated embodiment, desserts with round sticks 28a and desserts with sticks with elongated lengths 28b are simultaneously placed within the plurality of channels 16 of the dessert display stand. Additionally, in the illustrated embodiment, the cards or the slips 29 are placed into the plurality of grooves 26, such as to add a customized decorative appearance to the dessert display stand.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dessert display stand, comprising:
    a plurality of panels;
    the plurality of panels comprising at least three panels;
    each panel of the plurality of panels comprising a first side opposite a second side;
    the first side of each panel comprising a male interface;
    the second side of each panel comprising a female interface;
    the male interface configured to engage the female interface of an adjoining panel of the plurality of panels;
    the male interface being structurally distinct from the female interface;
    at least one channel disposed on the panel between the first side and the second side of each panel of the plurality of panels;
    the at least one channel dimensioned to receive a stick of a dessert therethrough.

2. The dessert display stand of claim 1, wherein each panel of the plurality of panels is arcuate in shape from the first side of each panel to the second side of each panel.

3. The dessert display stand of claim 1, wherein the male interface comprises a plurality of spherical protrusions and the female interface comprises a plurality of circular apertures with a singular slot extending downward from each circular aperture.

4. The dessert display stand of claim 1, wherein the male interface comprises a plurality of downward protrusions and the female interface comprising a plurality of slots.

5. The dessert display stand of claim 1, wherein the channel comprises a circular opening.

6. The dessert display stand of claim 1, wherein the channel comprises an elongated opening.

7. The dessert display stand of claim 1, wherein the channel comprises a circular opening with a pair of peripheral slots extending outward therefrom.

8. The dessert display stand of claim 1, wherein the male interface and the female interface extend inward towards an internal surface of each panel from the first side of each panel and the second side of each panel.

9. The dessert display stand of claim 1, wherein each panel further comprises at least one decoration receptacle disposed on an external surface of the panel.

10. The dessert display stand of claim 1, wherein a stopper is disposed within each channel.

\* \* \* \* \*